United States Patent
Ims

(10) Patent No.: US 6,560,618 B1
(45) Date of Patent: *May 6, 2003

(54) ON-DEMAND GENERATION, PACKAGING, AND DELIVERY OF ARCHIVE FILES

(75) Inventor: Steven D. Ims, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/533,314

(22) Filed: Mar. 22, 2000

(51) Int. Cl.[7] ............... G06F 17/00; G06F 17/30; G06F 9/44
(52) U.S. Cl. ............... 707/204; 707/104.1; 707/10
(58) Field of Search ............... 707/9, 10, 103, 707/104.1, 203, 204; 709/246, 236, 310–319, 225, 226, 217–203; 717/1–6, 125, 116, 143, 122, 108

(56) References Cited

U.S. PATENT DOCUMENTS 6,161,107 A * 12/2000 Stern ............... 707/104
6,286,051 B1 * 9/2001 Becker et al. ............... 709/236
6,385,769 B1 * 5/2002 Lewallen ............... 717/125

* cited by examiner

Primary Examiner—Safet Metjahic
Assistant Examiner—Te Yu Chen
(74) Attorney, Agent, or Firm—Jeanine S. Ray-Yarletts; Marcia L. Doubet

(57) ABSTRACT

A method, system, and computer program product for enabling the on-demand generation, packaging, and delivery of archive files (such as cabinet, or ".cab", files and Java archive, or ".jar", files). This technique provides a more powerful, more flexible archive capability than the static technique of the prior art. A target server application is specified in place of a static pre-packaged archive file name, where this target will dynamically create an archive file in an application-dependent manner. Zero or more parameter name/value pairs may be specified as well, where the parameter values may be used by the target to customize the dynamic creation. Once created, archive files may optionally be cached to optimize future invocations of the archive content delivery process. Existing browser software may take advantage of the present invention without modification.

39 Claims, 5 Drawing Sheets

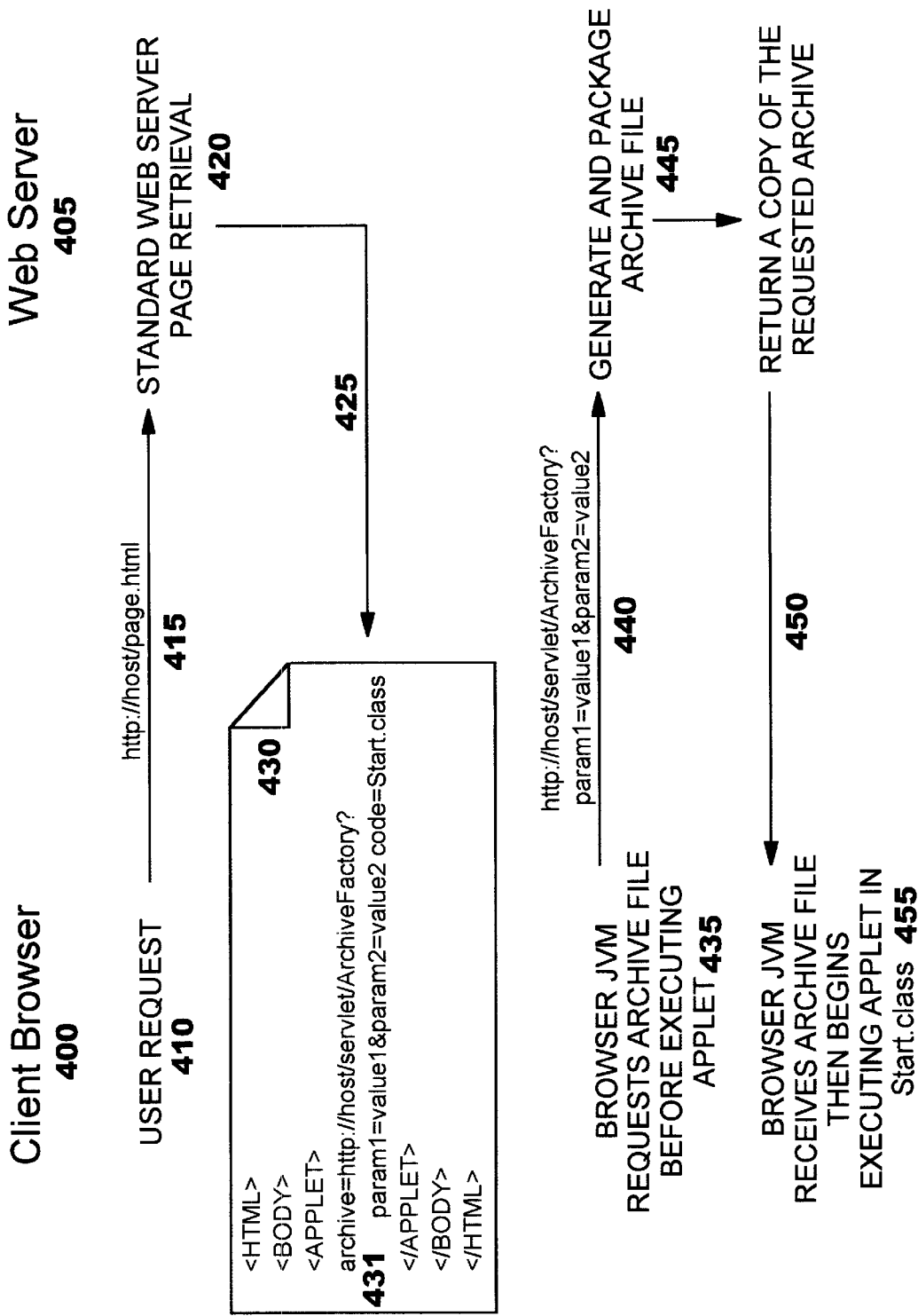

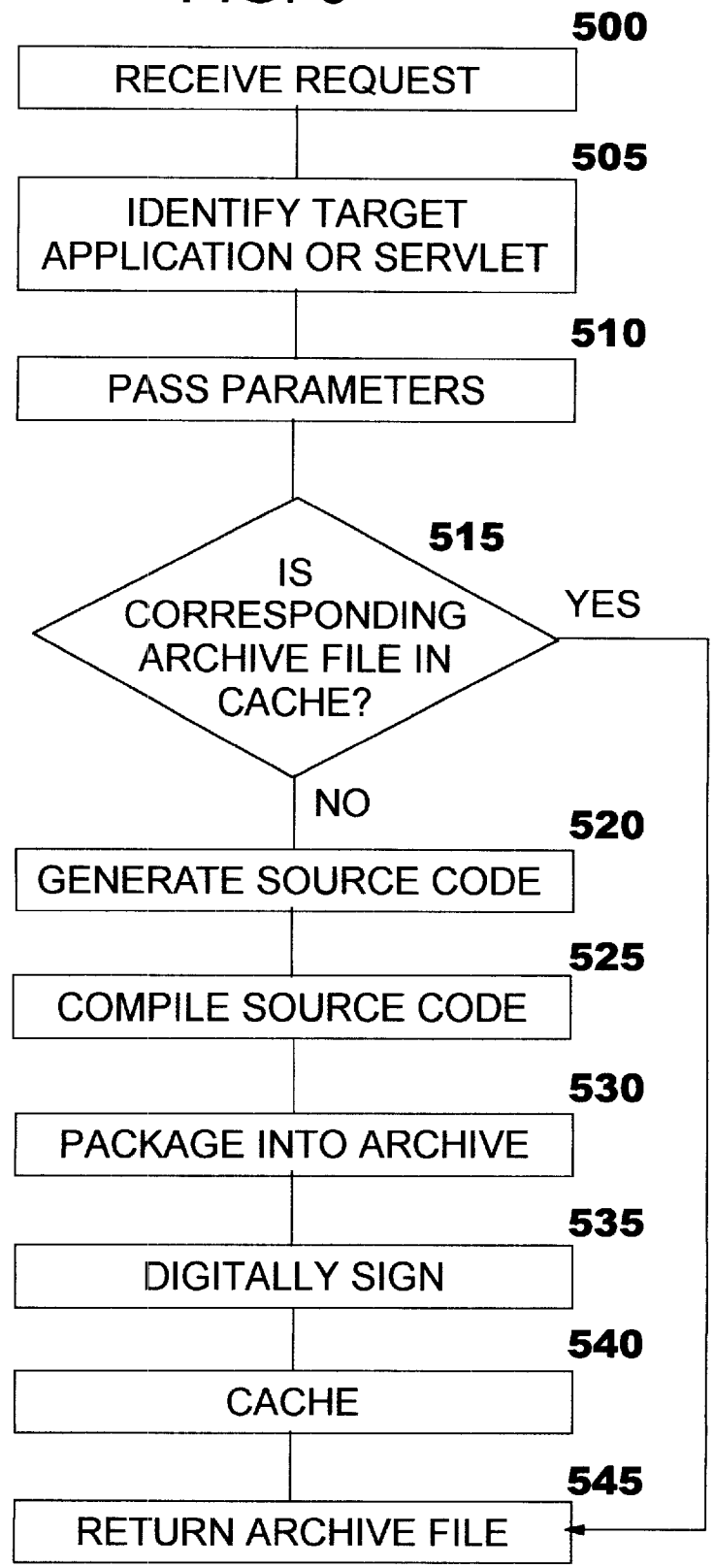

ON-DEMAND GENERATION, PACKAGING, AND DELIVERY OF ARCHIVE FILES

Related Invention

The present invention is related to the IBM invention having Ser. No. 09/533,315, entitled "Technique for Automatically and Transparently Transforming Remote Software Components into Client/Server Components", filed concurrently herewith on Mar. 22, 2000.

BACKGROUND OF THE INVENTION

1. Field of the Invention

The present invention relates to a computer system, and deals more particularly with a method, system, and computer program product for enabling the on-demand generation, packaging, and delivery of archive files (such as cabinet, or ".cab", files and Java archive, or ".jar", files).

2. Description of the Related Art

The Java programming language developed by Sun Microsystems, Inc. has gained wide acceptance for writing software for the Internet and World Wide Web. While compilers for most programming languages generate code for a particular operating environment, Java enables writing programs using a "write once, run anywhere" paradigm. ("Java" and "Write Once, Run Anywhere" are trademarks of Sun Microsystems, Inc.)

Java attains its portability through use of a specially-designed virtual machine ("VM"). This virtual machine is also referred to as a "Java Virtual Machine"or "JVM". The virtual machine enables isolating the details of the underlying hardware from the compiler,used to compile the Java programming instructions. Those details are supplied by the implementation of the virtual machine, and include such things as whether little Endian or big Endian format is used for storing compiled instructions, and the length of an instruction once it is compiled. Because these machine-dependent details are not reflected in the compiled code, the code can be transported to a different environment (a different hardware machine, a different operating system, etc.), and executed in that environment without requiring the code to be changed or recompiled—hence the phrase "site once, run anywhere". The compiled code, referred to as Java "bytecode", then runs on top of a JVM, where the JVM is tailored to that specific operating environment. As an example of this tailoring of the JVM, if the bytecode is created using little Endian format but is to run on a microprocessor expecting big Endian, then the JVM would be responsible for converting the instructions from the bytecode before passing them to the microprocessor.

Programs written in Java take two forms: applications and applets. Java applications are similar in operational characteristics to applications in other programming languages. A Java applet, on the other hand, is a special type of application which is intended to be dynamically downloaded at run-time to a user's machine along with a Web page which invokes the code in the applet. Java applets thus provide a powerful model for dynamic network computing, where the applet software can be distributed within the traditional Web browsing paradigm with which many computer users are familiar. Java-enabled browsers make it very easy for a user to run a downloaded Java applet, where the user is required to do nothing more for execution than pointing the browser at the applet and clicking on a button. When initiated, the applet then runs within the Web browser that displays the Web page.

A number of files and classes may be required to run a particular Java applet, and the requirements for each applet may be different depending on the applet's functionality. For example, one applet may display an image; another may calculate mortgage payments; still another may play a song; etc. To ensure that an applet has the required files and classes available on each client machine to which it is downloaded, those applet-specific files are typically packaged together with, and distributed with, the file containing the executable applet code. The file containing this package of information is referred to as an "archive" file.

Archive file contents are typically compressed, using a technique such as Lempel-Ziv compression, to reduce download time and thereby make the network distribution process more efficient. The file contents may also be digitally signed so that the receiver may verify that the contents were obtained from a trusted source. There are currently two popular archive file formats: (1) Java archive, or "JAR", format; and (2) cabinet, or "CAB"format. While the "JAR" file format is used to distribute and archive Java applet files (to be processed, for example, by a Netscape Navigator® browser), the "CAB" file format is used for distributing and archiving files for the Internet Explorer browser. An archive file created in one of these formats has the file suffix ".jar" or ".cab", respectively. ("Netscape Navigator" is a registered trademark of Netscape Communication Corporation.)

The files and classes which are to be packaged into a specific archive file are statically specified. Typically, the file and class names are entered into a file, where this file is then processed by a utility program. The utility program locates each specified file, retrieves a copy of that file, and includes the copy into the archive package which is being created. Once all the specified files are retrieved (and compressed and digitally signed, when applicable), the archive file is then stored. Upon receiving a request for a Web page which includes an applet reference, a server returns the requested Web page containing the applet reference; when the applet is then initiated from the rendered Web page, a subsequent request for the applet's archive file is automatically sent back to the server by the rendering browser, and the server responds by returning the archive file.

This prior art approach is relatively inflexible, however, due to the manner in which the archive file content is statically specified and statically stored. Each file or class that is to be included in the archive must already exist. In some dynamic network computing scenarios, this may be not desirable or even possible. For example, consider an applet which allows a bank's customer to review checking-account information. Electronic access to the checking-account information may require the applet to communicate with an application running on a different computer. A statically-generated archive file of the prior art cannot provide up-to-date communication-support code for the applet based upon the most current version of the server application.

According a need exists for a technique by which these shortcomings in the prior art can be overcome. This technique should provide the capability of dynamically retrieving and packaging the content of an archive file, at the time when the archived content is to be delivered to a requester, such that the packaged information is up-to-date. Preferably, the technique also enables specifying, with each content request, parameter values that may be used to dynamically generate the content. The present invention defines a novel approach to solving these problems, which will result in greater flexibility in specifying and constructing archive files.

SUMMARY OF THE INVENTION

An object of the present invention is to provide a technique whereby shortcomings in prior art archive file techniques can be overcome.

Still another object of the present invention is to provide a technique that will result in greater flexibility in specifying and constructing archive files.

Another object of the present invention is to provide a technique for dynamically retrieving and packaging the content of an archive file.

It is another object of the present invention to provide this technique such that the packaged information of an archive file is up-to-date at the time when the archived content is to be delivered to a requester.

It is yet another object of the present invention to provide a technique which enables specifying, with each content request, parameter values that may be used to dynamically generate (and customize) archive file content.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for dynamic archive file retrieval. This technique comprises: automatically sending a request for an archive file to a server over a network connection, responsive to encountering a reference to the archive file during execution of code on a client workstation, and wherein the request identifies a dynamic archive builder accessible from the server; dynamically building the requested archive file; returning the dynamically built archive file to the client workstation; and executing a program contained in the returned archive file at the client workstation. The reference may be a Uniform Resource Locator (URL) address of the dynamic archive builder.

The dynamic building may further comprise: generating or retrieving, by the dynamic archive builder, one or more files needed for the requested archive file, responsive to receiving the request; compiling selected ones of the generated or retrieved files; and packaging the compiled files and the generated or retrieved files which are not compiled, thereby creating the requested archive file.

The request may further specify one or more parameters, in which case the dynamic building may use these parameters to customize the requested archive file. The values of the parameters may be statically assigned, or they may be assigned dynamically, or a combination thereof.

The returned archive file may be a Java archive file, and the program may be a Java applet, a Java application, etc. Or, the returned archive file may be a cabinet file (or another type of archive file). When the returned archive file is a cabinet file, the program may be an applet, an application, etc.

The technique may further comprise: storing the dynamically built archive file in an archive cache; checking the archive cache, prior to operation of the dynamic building, for a previously cached version of the requested archive file; and bypassing operation of the dynamic building when the version is found. In this case, the returned archive file is the version found in the archive cache.

In one aspect, the technique may further comprise compressing the dynamically built archive file prior to the returning, in which case the returned archive file is the compressed file. In another aspect, the technique may further comprise digitally signing the dynamically built archive file prior to the returning, in which case the returned archive file is the digitally signed file.

The present invention will now be described with reference to the following drawings, in which like reference numbers denote the same element throughout.

BRIEF DESCRIPTION OF THE DRAWINGS

FIG. 4 depicts the flow of messages between a client browser and a Web server, according to the present invention; and FIG. 5 depicts the logic which may be used to implement a preferred embodiment of the present invention.

DESCRIPTION OF THE PREFERRED EMBODIMENT

Figure 1:
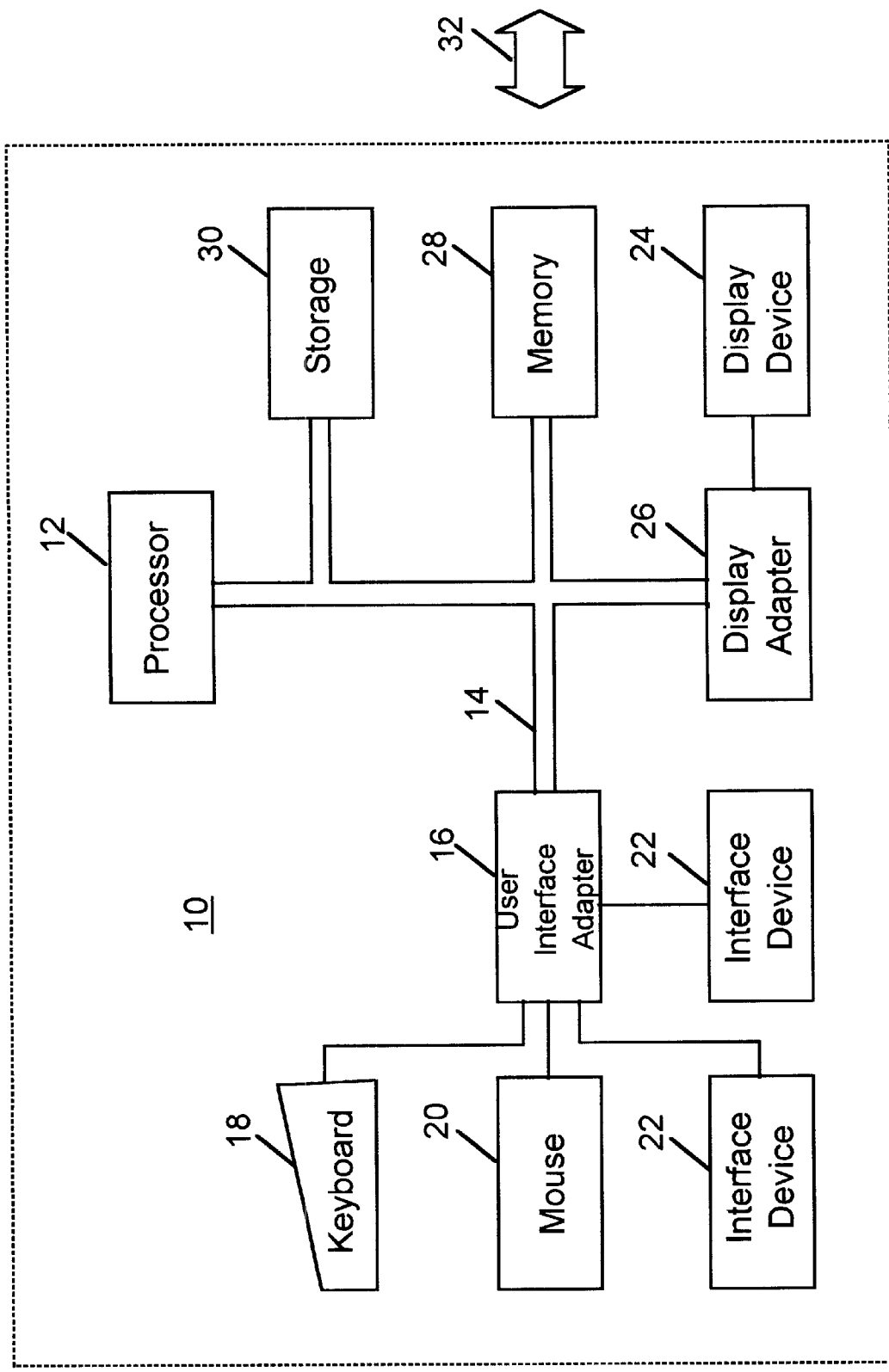
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
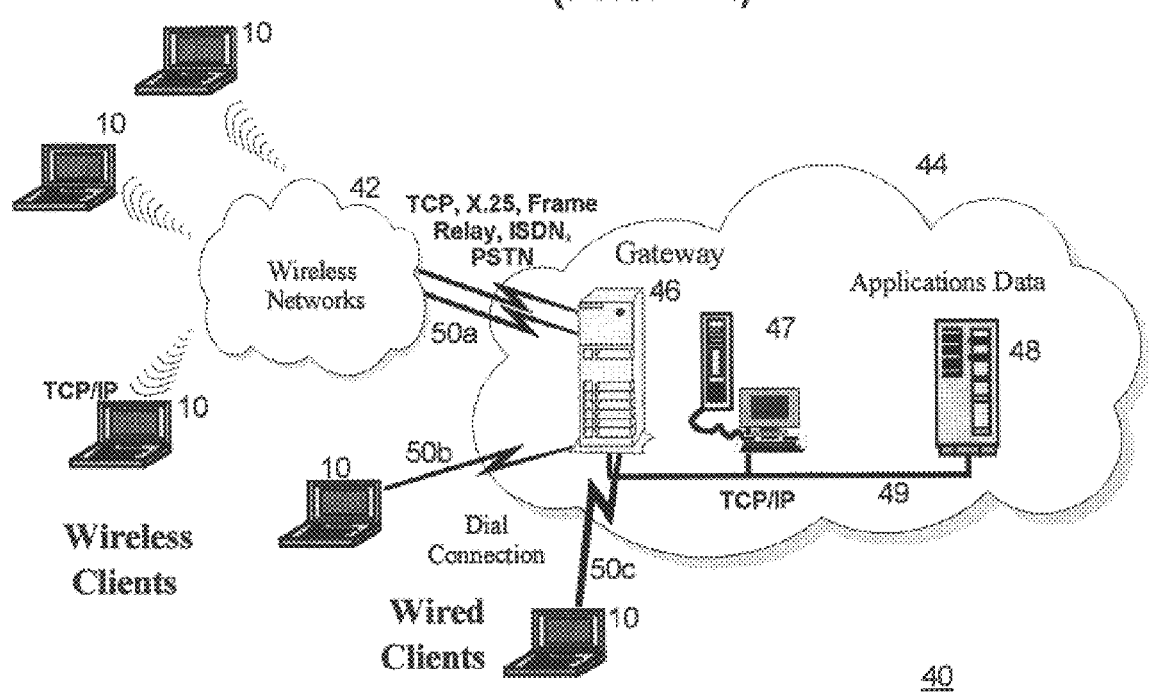
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstation 10. Additionally, as those skilled in the art will appreciate, one or more LANs may be included (not shown), where a LAN may comprise a plurality of intelligent workstation coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstation 10 using a communications link 50b, 50c. The gateway computer 46 may be implemented utilizing an Enterprise Systems Architecture/370 available from the International Business Machines Corporation ("IBM"), or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390"·"Application System/400"and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as a computer software program. Availability of a network connection is assumed, which must be operable at the time when the request for dynamic loading of applet software onto a user's workstation is invoked. In the preferred embodiment, the present invention is implemented as one or more modules (also referred to as code subroutines, or "objects" in object-oriented programming). The server to which the client computer connects may be functioning as a Web server, where that Web server provides services in response to requests from a client connected through the Internet. Alternatively, the server may be in a corporate intranet or extranet of which the client's workstation is a component, or in any other networking environment. For ease of reference, the server is referred to herein as a "Web server". The present invention operates independently of the communications protocol used to send messages or files between the client and server, although the HTTP (HyperText Transfer Protocol) protocol running on TCP/IP is used herein as an example when discussing these message flows.

The present invention provides a more flexible and more powerful archive file technique than is available in the prior art, enabling the archive content to be dynamically specified, generated, and packaged for delivery in response to a particular request. Advantages of using this technique include: (1) smaller code size and (2) customized file content. Smaller code size is achieved because archive files of the prior art typically specify all files that an applet might need. (That is, the archive file prepares the applet to be executed on a randomly-selected user workstation, without regard to whether any of the files in the archive happen to be already available on a particular workstation.) By using the present invention, and applet can specify the exact set of files which are required for the archive, where the required set for a particular applet may vary over time and/or among different requesting workstations. Customizing the files which are included in the archive in this manner will often lead to a smaller archive package (and a corresponding reduction in network transfer time). Customized file content can be created with the present invention, for example through parameter values which are specified on the applet tag. (The syntax of applet tags is discussed below with reference to FIG. 3.) As one example of how this customization feature may be used, suppose a particular applet needs a network connection to a particular backend data server. The client browser may have limited support for network communication and so may require special processing instructions to communicate with the data server. An appropriate identifier can be passed as a parameter to the archive-file-creation process (as described in more detail below), such that the code which is packaged and downloaded to the client workstation is appropriate to the client's capabilities.

Furthermore, the on-demand generation, packaging, and delivery that is available when using the present invention is a simple-to-use technique which does not require a user to manually perform any intermediate steps between requesting a Web page and invoking the downloaded applet code. In addition, because the archive contents are created automatically and dynamically when needed, the user may be assured of receiving the latest version thereof.

The present invention has been used to implement a new client/server application for IBM's HostPublishe product version 2.2. This application enables remote client access to objects which are generated by HostPublisher and which are referred to as "IntegrationObjects". An IntegrationObject is an application-specific encapsulation of legacy host access code, or database access code, specified as a reusable Java bean. These IntegrationObjects are stored in Java archive files on a server. When downloaded to a client workstation, the bean is then locally executed. Using the present invention, the executable code to be downloaded in an object may be customized as the archive file is being dynamically generated for a particular request. This approach provides a very powerful and flexible, yet easy to use and easy to administer, technique for delivering customized software in a network computing environment.

The preferred embodiment of the present invention will now be discussed in more detail with reference to FIGS. 3 through 5.

Figure 3A:
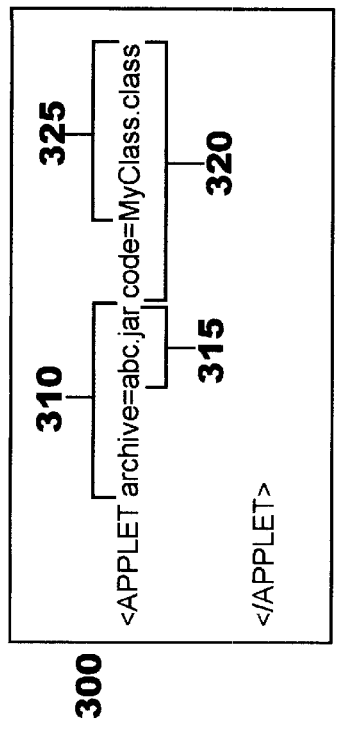
FIGS. 3A and 3B depict the syntax used for requesting an archive file in the prior art, and an example of the syntax that may be used to request a dynamic archive file according to a preferred embodiment of the present invention, respectively.

Current browser implementations provide support for automatically retrieving and unpackaging archived files. As shown in FIG. 3A, an <APPLET> tag 300 is used, where an "archive=archive_file_name" parameter 310 is used to specify which archive file is to be retrieved, and a "code=starting_class_name" parameter 320 is used to identify the Java class which contains the applet's entry point. When the <APPLET> tag is used in a Web page, actual parameter values are substituted for these italicized terms. In the example of FIG. 3A, the archive is stored in a file named "abc.jar" 315, and the entry point is in the class file named "MyClass.class" 325.

Figure 3B:
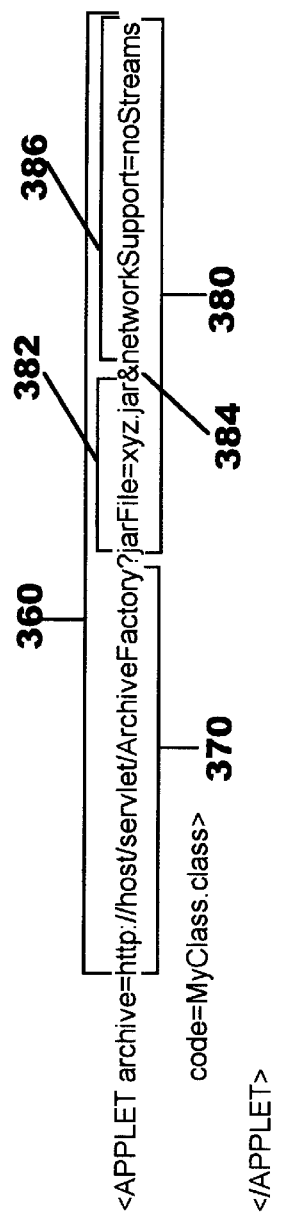

FIG. 3B depicts an example of how this <APPLET> syntax may be extended to request a dynamic archive file according to a preferred embodiment of the present invention. Rather than simply specifying a file name as the value of the archive parameter, as in the prior art syntax of FIG. 3A, a URL (Uniform Resource Locator) identifying the network location of a server application (a "dynamic archive builder") which will generate and package the archive file may now be specified using the extended applet tag syntax 350 shown in FIG. 3B. (The server application may be a servlet; a Common Gateway Interface, or "CGI", program; etc.) As depicted at element 360, this server application is preferably identified using a URL reference 370 and a parameter list 380 (appended as a standard URL query string) which specifies one or more parameters to be used by that application. In the example parameter list 380, a first parameter name/value pair 382 provides a name for the resulting archive file and a second pair 386 which provides application-specific information to be used in generating the code in the archive file. An ampersand 384 is used as a separator between the name/value pairs 382, 386. (While two pairs 382, 386 are shown in FIG. 3B, this number may be reduced or extended as required for a particular application.) The parameter values are used in generating the archive file, as will be described below with reference to FIG. 5.

The actual parameter values used with the present invention may be statically assigned (i.e. hard-coded) on the <APPLET> tag. Alternatively, values may be assigned dynamically when appropriate, using prior art techniques such as client-side JavaScript™ programming, or server-side processing such as JavaServer™ Pages. ("JavaScript" and "JavaServer" are trademarks of Sun Microsystems, Inc.) As examples of when this dynamic assignment is useful, it may be desirable to customize an archive file to reflect attributes of the client workstation environment such as: the client's device type; operating system type; JVM level; browser type; security API (Application Programming Interface) in use by the client browser; which user interface library is available (Swing, AWT, and so forth); a name or other identification of the workstation user; etc. Sample parameter name/value pairs for information of this type are:

osName=Windows_NT_4.0 jvmLevel=jdk 1.1

(indicating the operating system type and the JVM level, respectively). Values of attributes such as these are available for access using prior art techniques, and may be assigned as parameter values.

When the present invention is used with CAB files, the archive information is preferably specified in a <PARAM name=cabinets value=(URL_reference?cabFile=file_name.cab /> tag which is coded as a subtag, or child tag, of the APPLET tag. (Cabinet files may be used with applets or to package content to be used with applications, as is well known in the art.)

FIG. 4 depicts the flow of messages between a client browser and a Web server, according to the present invention, indicating how this flow carries the extended applet tag syntax described herein. At 410, a user requests a Web page for rendering with his browser 400. An HTTP request is then transmitted 415 to Web server 405, where the HTTP request contains a URL reference ("host/page.html", in this example) specifying a network location for the Web page of interest. Techniques which are known in the art, and which do not form part of the present invention, are used to retrieve 420 this Web page by Web server 405. The retrieved Web page is then returned 425 to the client browser 400. Sample Web page 430 contains the extended applet tag syntax 431 of the present invention, described above with reference to FIG. 3B. When the browser's JVM encounters this applet tag, it automatically requests 435 the referenced archive file by sending a subsequent HTTP request 440 to the server 405, where this subsequent request includes the value of the "archive=" parameter. Upon receiving the subsequent request 440 at Web server 405, the archive file is dynamically generated and packaged 445, as described in more detail with reference to FIG. 5. This file is then returned 450 to the client browser 400. Upon receiving the archive file, the client browser 405 begins executing 455 the applet according to the value of the "code=" tag.

Note that the automatic request 440 is sent using existing browser facilities, and that execution 455 also occurs using existing browser facilities. Thus, the advantages of the present invention may be realized without requiring modification of existing browser implementations.

FIG. 5 depicts the logic which may be used to implement, a preferred embodiment of the present invention. This logic is invoked at a server upon receiving a request such as HTTP request 440 of FIG. 4, and comprises the processing that occurs at 445 of FIG. 4. The processing begins at Block 500, where the HTTP request is received. At Block 505, the target application specified on the HTTP request is identified. Block 510 passes the parameters from the HTTP request to this target, which will use the parameter values in an application-dependent manner for preparing (and customizing, when applicable) the archive file.

According to the preferred embodiment, a cache of archive files is maintained, where the parameter information used in creating each archived file is used as an identifier or index to distinguish among the cached files. As with caches of the prior art, use of an archive cache with the present invention enables faster, more efficient delivery of requested content for subsequent requests of a previously-cached file. However, this optimization may be omitted without deviating from the inventive concepts of the present invention. When the cache is implemented, Block 515 checks to see whether the parameters passed at Block 510 identify an already-cached file. If so, then control transfers to Block 545; otherwise, processing continues at Block 520.

Block 520 generates or retrieves, as applicable, the content used for the applet in an application-dependent manner, according to the logic coded into the target application and using the parameter values passed at Block 510. (Portions of the content to be used in the archive file may have already been generated. In this case, that content is simply retrieved.) The generated or retrieved content may then be compiled, as necessary, into one or more class files at Block 525. The code resulting from the processing of Blocks 520 and 525 may then be compressed (using existing techniques such as Lempel-Ziv compression), if desired, and is then packaged (Block 530) into an archive file. Preferably, the archive file is then digitally signed at Block 535, using techniques which are well known in the art.

At Block 540, the dynamically created archive file is cached (when the caching optimization is implemented), along with the parameter information which will enable subsequent lookup and retrieval of a selected cached archive file. The archive file which has been newly created according to the processing of Blocks 520–535, or which has been located in the cache at Block 515, is then returned to the requester at Block 545. The processing of FIG. 5 then ends for this invocation.

The preferred embodiment of the present invention has been described with reference to its use for retrieving dynamically generated, compiled, and packaged archive files which are referenced from a Java <APPLET> tag. However, the inventive concepts which have been disclosed herein may be used advantageously with Java applications as well. Java applications make use of a class loader to retrieve Java classes of an application as they are required, as is known in the art, using information from the CLASSPATH environment variable. Applets, on the other hand, make use of a network-based class loader, as is also well known in the art. By using a network-based class loader for loading the classes of an application, the techniques of the present invention may be used for obtaining dynamically generated, customized class files. The manner in which this network-based class loader is used with Java applications will be obvious to one of skill in the art.

While the preferred embodiment of the present invention has been described, additional variations and modifications in that embodiment may occur to those skilled in the art once they learn of the basic inventive concepts. In particular, while the present invention has been described with reference to the Java programming language and certain features of that language, the inventive concepts disclosed herein may be adapted to changes in this language or its features, and may be used with alternative languages and/or features which function in an analogous manner to those discussed herein. Therefore, it is intended that the appended claims shall be construed to include both the preferred embodiment and all such variations and modifications as fall within the spirit and scope of the invention.

I claim:

1. A computer program product for dynamic archive file retrieval, said computer program product embodied on a computer-readable medium and comprising:

computer-readable program code means for automatically sending a request for an archive file from a client workstation to a server over a network connection, responsive to encountering a reference to said archive file during execution of code on said client workstation, and wherein said request identifies a dynamic archive builder accessible from said server;

computer-readable program code means for dynamically building said requested archive file by said dynamic archive builder;

computer-readable program code means for returning said dynamically built archive file to said client workstation over said network connection; and computer-readable program code means for executing a program contained in said returned archive file at said client workstation.

2. The computer program product according to claim 1, wherein said computer-readable program code means for dynamically building further comprises:

computer-readable program code means for generating or retrieving, by said dynamic archive builder, one or more files needed for said requested archive file, responsive to receiving said request;

computer-readable program code means for compiling selected ones of said generated or retrieved files; and computer-readable program code means for packaging said compiled files and said generated or retrieved files which are not compiled, thereby creating said requested archive file.

3. The computer program product according to claim 1, wherein said request further specifies one or more parameters, and wherein said computer-readable program code means for dynamically building uses said parameters to customize said requested archive file.

4. The computer program product according to claim 3, wherein values of said parameters are statically assigned.

5. The computer program product according to claim 3, wherein values of said parameters are statically assigned or dynamically assigned.

6. The computer program product according to claim 1, wherein said returned archive file is a Java archive file and said program is a Java applet.

7. The computer program product according to claim 1, wherein said returned archive file is a Java archive file and said program is a Java application.

8. The computer program product according to claim 1, wherein said returned archive file is a cabinet file and said program is an applet.

9. The computer program product according to claim 1, wherein said returned archive file is a cabinet file and said program is an application.

10. The computer program product according to claim 1, further comprising:

computer-readable program code means for storing said dynamically built archive file in an archive cache;

computer-readable program code means for checking said archive cache, prior to operation of said computer-readable program code means for dynamically building, for a previously cached version of said requested archive file; and computer-readable program code means for bypassing operation of said computer-readable program code means for dynamically building when said version is found;

and wherein said computer-readable program code means for returning returns said version found in said archive cache.

11. The computer program product according to claim 1, further comprising computer-readable program code means for compressing said dynamically built archive file prior to operation of said computer-readable program code means for returning; and wherein said computer-readable program code means for returning returns said compressed file.

12. The computer program product according to claim 1, further comprising computer-readable program code means for digitally signing said dynamically built archive file prior to operation of said computer-readable program code means for returning; and wherein said computer-readable program code means for returning returns said digitally signed file.

13. The computer program product according to claim 1, wherein said reference is a Uniform Resource Locator (URL) address of said dynamic archive builder.

14. A system for dynamic archive file retrieval in a computing environment, comprising:

means for automatically sending a request for an archive file from a client workstation to a server over a network connection, responsive to encountering a reference to said archive file during execution of code on said client workstation, and wherein said request identifies a dynamic archive builder accessible from said server;

means for dynamically building said requested archive file by said dynamic archive builder;

means for returning said dynamically built archive file to said client workstation over said network connection; and means for executing a program contained in said returned archive file at said client workstation.

15. The system according to claim 14, wherein said means for dynamically building further comprises:

means for generating or retrieving, by said dynamic archive builder, one or more files needed for said requested archive file, responsive to receiving said request;

means for compiling selected ones of said generated or retrieved files; and means for packaging said compiled files and said generated or retrieved files which are not compiled, thereby creating said requested archive file.

16. The system according to claim 14, wherein said request further specifies one or more parameters, and wherein said means for dynamically building uses said parameters to customize said requested archive file.

17. The system according to claim 16, wherein values of said parameters are statically assigned.

18. The system according to claim 16, wherein values of said parameters are statically assigned or dynamically assigned.

19. The system according to claim 14, wherein said returned archive file is a Java archive file and said program is a Java applet.

20. The system according to claim 14, wherein said returned archive file is a Java archive file and said program is a Java application.

21. The system according to claim 14, wherein said returned archive file is a cabinet file and said program is an applet.

22. The system according to claim 14, wherein said returned archive file is a cabinet file and said program is an application.

23. The system according to claim 14, further comprising:

means for storing said dynamically built archive file in an archive cache;

means for checking said archive cache, prior to operation of said means for dynamically building, for a previously cached version of said requested archive file; and means for bypassing operation of said means for dynamically building when said version is found;

and wherein said means for returning returns said version found in said archive cache.

24. The system according to claim 14, further comprising means for compressing said dynamically built archive file prior to operation of said means for returning; and wherein said means for returning returns said compressed file.

25. The system according to claim 14, further comprising means for digitally signing said dynamically built archive file prior to operation of said means for returning; and wherein said means for returning returns said digitally signed file.

26. The system according to claim 14, wherein said reference is a Uniform Resource Locator (URL) address of said dynamic archive builder.

27. A method for dynamic archive file retrieval in a computing environment, comprising the steps of:

automatically sending a request for an archive file from a client workstation to a server over a network connection, responsive to encountering a reference to said archive file during execution of code on said client workstation, and wherein said request identifies a dynamic archive builder accessible from said server;

dynamically building said requested archive file by said dynamic archive builder;

returning said dynamically built archive file to said client workstation over said network connection; and executing a program contained in said returned archive file at said client workstation.

28. The method according to claim 27, wherein said dynamically building step further comprises the steps of:

generating or retrieving, by said dynamic archive builder, one or more files needed for said requested archive file, responsive to receiving said request;

compiling selected ones of said generated or retrieved files; and packaging said compiled files and said generated or retrieved files which are not compiled, thereby creating said requested archive file.

29. The method according to claim 27, wherein said request further specifies one or more parameters, and wherein said dynamically building step uses said parameters to customize said requested archive file.

30. The method according to claim 29, wherein values of said parameters are statically assigned.

31. The method according to claim 29, wherein values of said parameters are statically assigned or dynamically assigned.

32. The method according to claim 27, wherein said returned archive file is a Java archive file and said program is a Java applet.

33. The method according to claim 27, wherein said returned archive file is a Java archive file and said program is a Java application.

34. The method according to claim 27, wherein said returned archive file is a cabinet file and said program is an applet.

35. The method according to claim 27, wherein said returned archive file is a cabinet file and said program is an application.

36. The method according to claim 27, further comprising the steps of:

storing said dynamically built archive file in an archive cache;

checking said archive cache, prior to operation of said dynamically building step, for a previously cached version of said requested archive file; and bypassing operation of said dynamically building step when said version is found; and wherein said returning step returns said version found in said archive cache.

37. The method according to claim 27, further comprising the step of compressing said dynamically built archive file prior to operation of said returning step; and wherein said returning step returns said compressed file.

38. The method according to claim 27, further comprising the step of digitally signing said dynamically built archive file prior to operation of said returning step; and wherein said returning step returns said digitally signed file.

39. The method according to claim 27, wherein said reference is a Uniform Resource Locator (URL) address of said dynamic archive builder.

\* \* \* \* \*